US011009850B2

(12) United States Patent
Nagatomo et al.

(10) Patent No.: US 11,009,850 B2
(45) Date of Patent: May 18, 2021

(54) ELECTRONIC MANUAL FOR MACHINE TOOL AND MACHINE TOOL

(71) Applicant: MAKINO MILLING MACHINE CO., LTD., Tokyo (JP)

(72) Inventors: Tomofumi Nagatomo, Aiko-gun (JP); Kayoko Ichimura, Minamitsuru-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 10 days.

(21) Appl. No.: 16/331,870

(22) PCT Filed: Sep. 9, 2016

(86) PCT No.: PCT/JP2016/076701
§ 371 (c)(1),
(2) Date: Mar. 8, 2019

(87) PCT Pub. No.: WO2018/047313
PCT Pub. Date: Mar. 15, 2018

(65) Prior Publication Data
US 2019/0377324 A1  Dec. 12, 2019

(51) Int. Cl.
*G06F 17/00* (2019.01)
*G05B 19/4063* (2006.01)
(Continued)

(52) U.S. Cl.
CPC ......... *G05B 19/4063* (2013.01); *B23Q 17/00* (2013.01); *G05B 19/0428* (2013.01);
(Continued)

(58) Field of Classification Search
CPC ..... G06F 3/147; G06F 16/00; G05B 19/4063; G05B 2219/23157; G05B 19/409;
(Continued)

(56) References Cited

U.S. PATENT DOCUMENTS 4,991,077 A * 2/1991 Kawasaki ............. G06F 3/0489
700/83
5,189,624 A * 2/1993 Barlow ............ G05B 19/41895
700/169
(Continued)

FOREIGN PATENT DOCUMENTS

CN  101446808  6/2009
JP  2002-197216  7/2002
(Continued)

OTHER PUBLICATIONS

International Search Report dated Nov. 22, 2016, directed to International Patent Application No. PCT/JP2016/076701; 2 pages.

*Primary Examiner* — Laurie A Ries
(74) *Attorney, Agent, or Firm* — Morrison & Foerster LLP

(57) ABSTRACT

An electronic manual for a machine tool for displaying information related to operation, maintenance, or inspection of the machine tool, which is necessary for an operator, includes an operator-operated input part for inputting search conditions to search the electronic manual in accordance with intent of the operator in order to obtain necessary information, a machine-operated input part for selecting and inputting at least one item provided to the operator from the machine tool depending on a status of the machine tool, and a display part for displaying information related to operation, maintenance, or inspection of the machine tool corresponding to the input from the operator-operated input part or the machine-operated input part.

4 Claims, 10 Drawing Sheets

(51) Int. Cl.
  *G06F 16/00* (2019.01)
  *B23Q 17/00* (2006.01)
  *G05B 19/042* (2006.01)
  *G05B 23/02* (2006.01)
  *G06F 3/147* (2006.01)
  *G06Q 10/00* (2012.01)

(52) U.S. Cl.
  CPC ............ *G05B 23/02* (2013.01); *G06F 3/147* (2013.01); *G06F 16/00* (2019.01); *G06Q 10/00* (2013.01); *G05B 2219/23157* (2013.01)

(58) Field of Classification Search
  CPC ...... G05B 2219/35494; G05B 19/0428; G05B 23/02; B23Q 17/00; G06Q 10/00
  See application file for complete search history.

(56) References Cited

U.S. PATENT DOCUMENTS

| | | | | |
|---|---|---|---|---|
| 5,513,264 A | * | 4/1996 | Wang | G06K 7/1095 209/546 |
| 5,848,426 A | * | 12/1998 | Wang | G06F 16/93 715/210 |
| 6,138,056 A | * | 10/2000 | Hardesty | G05B 19/4063 700/174 |
| 6,961,712 B1 | * | 11/2005 | Perkowski | G06Q 30/02 705/26.62 |
| 2004/0046805 A1 | * | 3/2004 | Brand | G06F 3/0482 715/848 |
| 2005/0004816 A1 | * | 1/2005 | Abraham-Fuchs | G16H 15/00 705/3 |
| 2009/0138106 A1 | * | 5/2009 | Komatsu | G05B 19/0428 700/79 |
| 2014/0303755 A1 | * | 10/2014 | Landgraf | G05B 19/41855 700/83 |
| 2016/0086362 A1 | * | 3/2016 | Suzuki | G06F 15/02 345/440 |
| 2016/0117090 A1 | * | 4/2016 | Fujitsuka | G05B 19/409 715/765 |
| 2017/0160715 A1 | * | 6/2017 | De Boer | G05B 23/0216 |
| 2017/0269811 A1 | * | 9/2017 | Tsujimura | G06F 3/04817 |

FOREIGN PATENT DOCUMENTS

| | | | |
|---|---|---|---|
| JP | 2002197216 A | * | 7/2002 |
| JP | 2002232584 A | * | 8/2002 |
| JP | 2011-160305 | | 8/2011 |
| JP | 2014-24150 | | 2/2014 |
| JP | 2016-99800 | | 5/2016 |

* cited by examiner

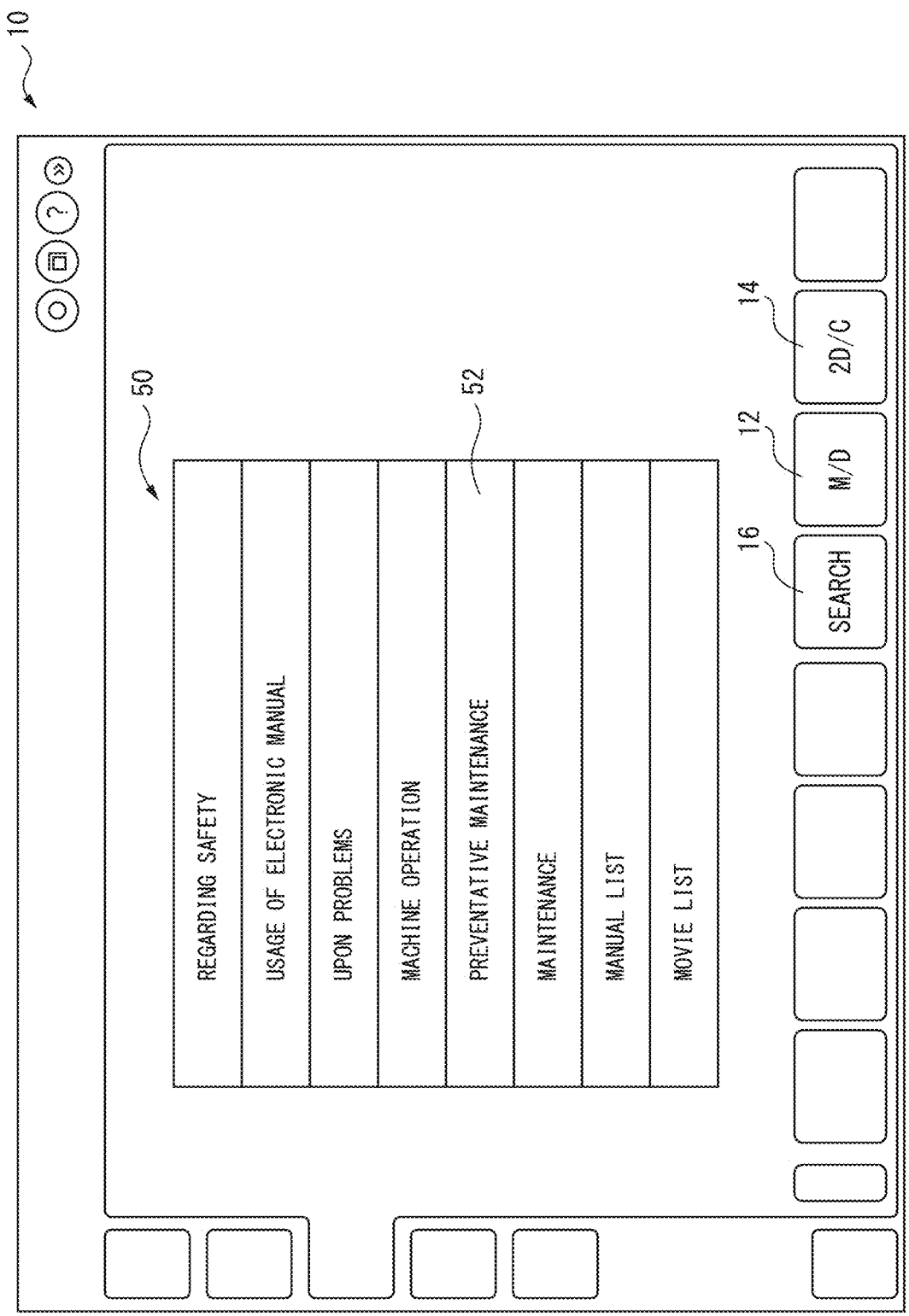

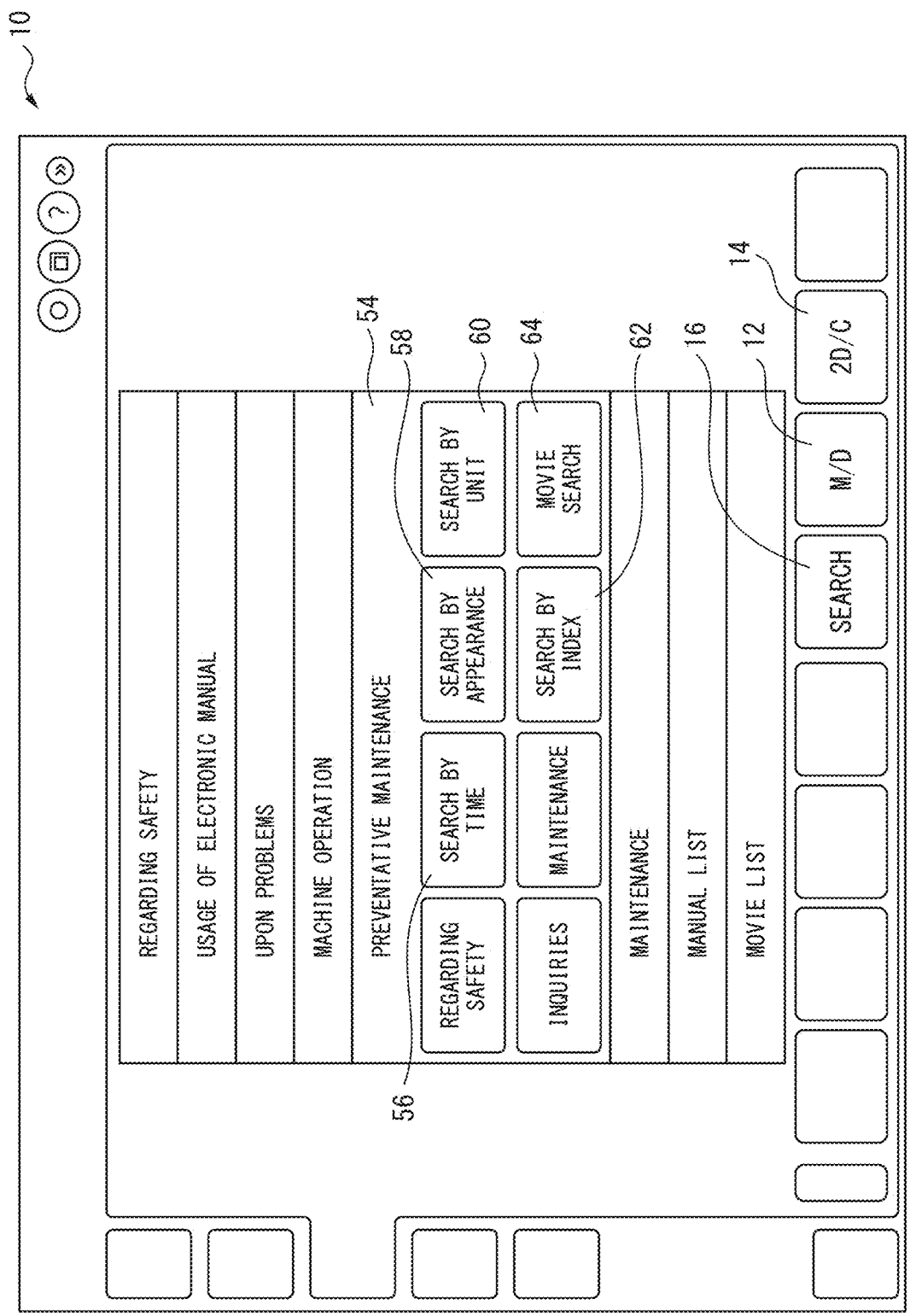

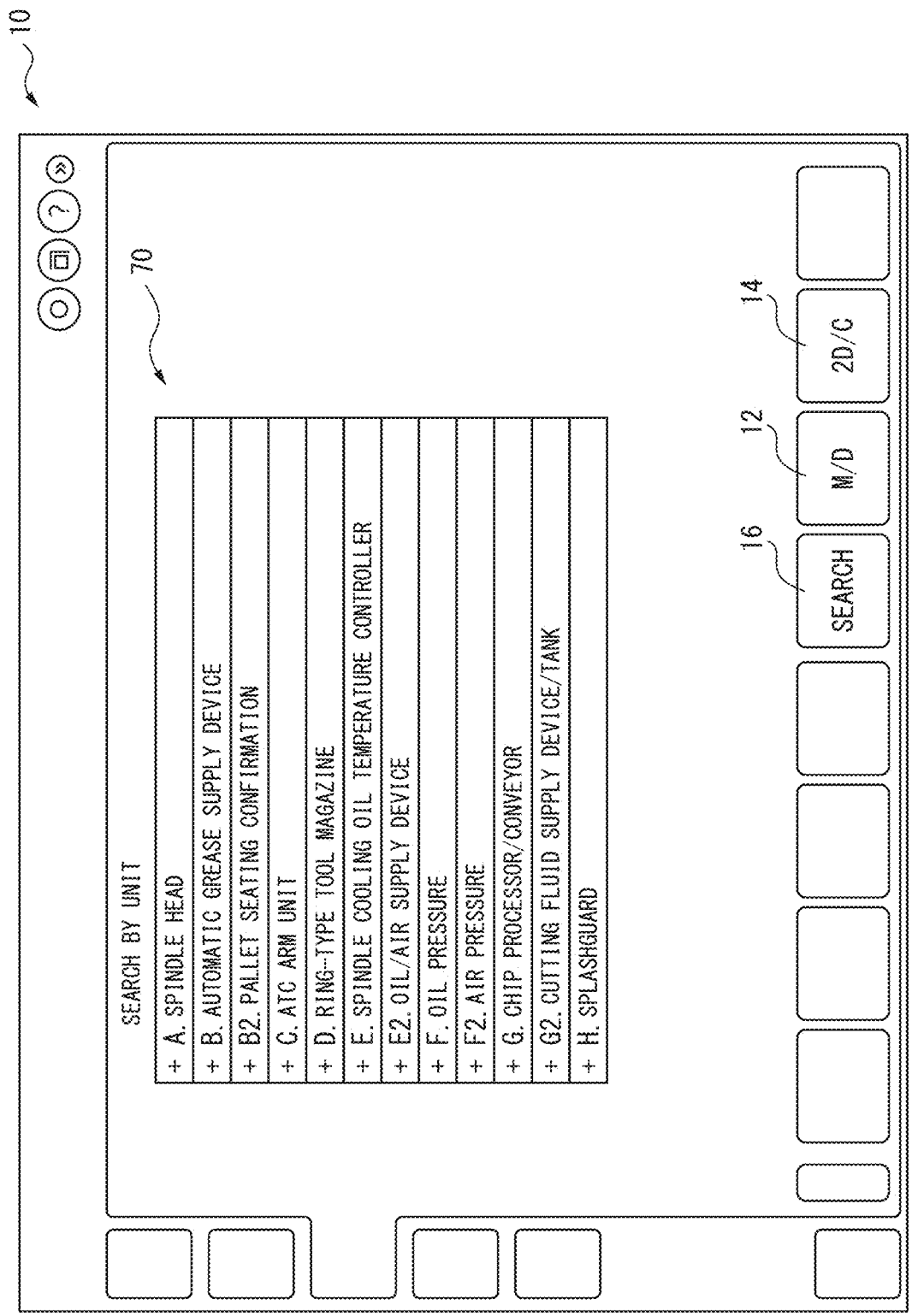

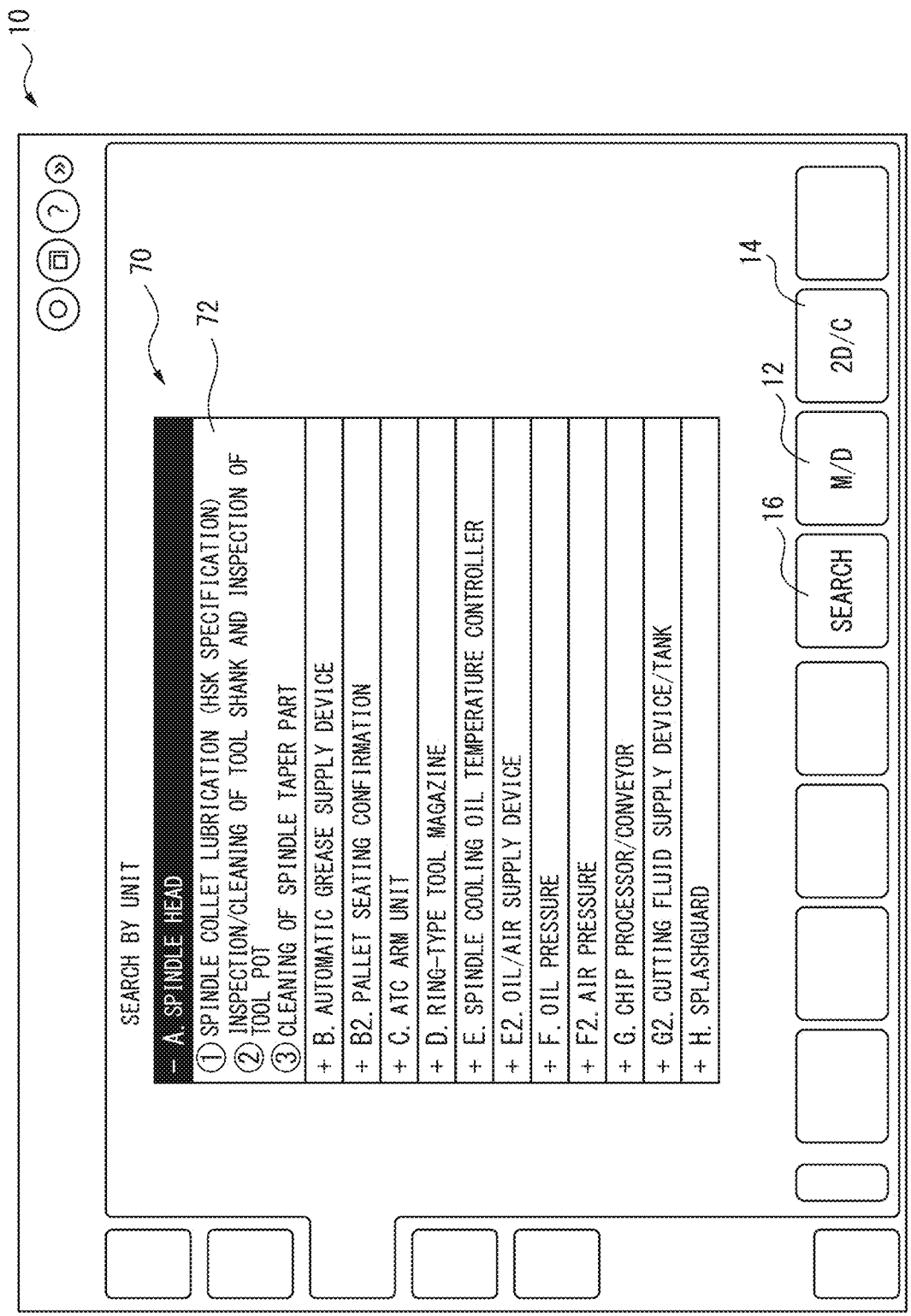

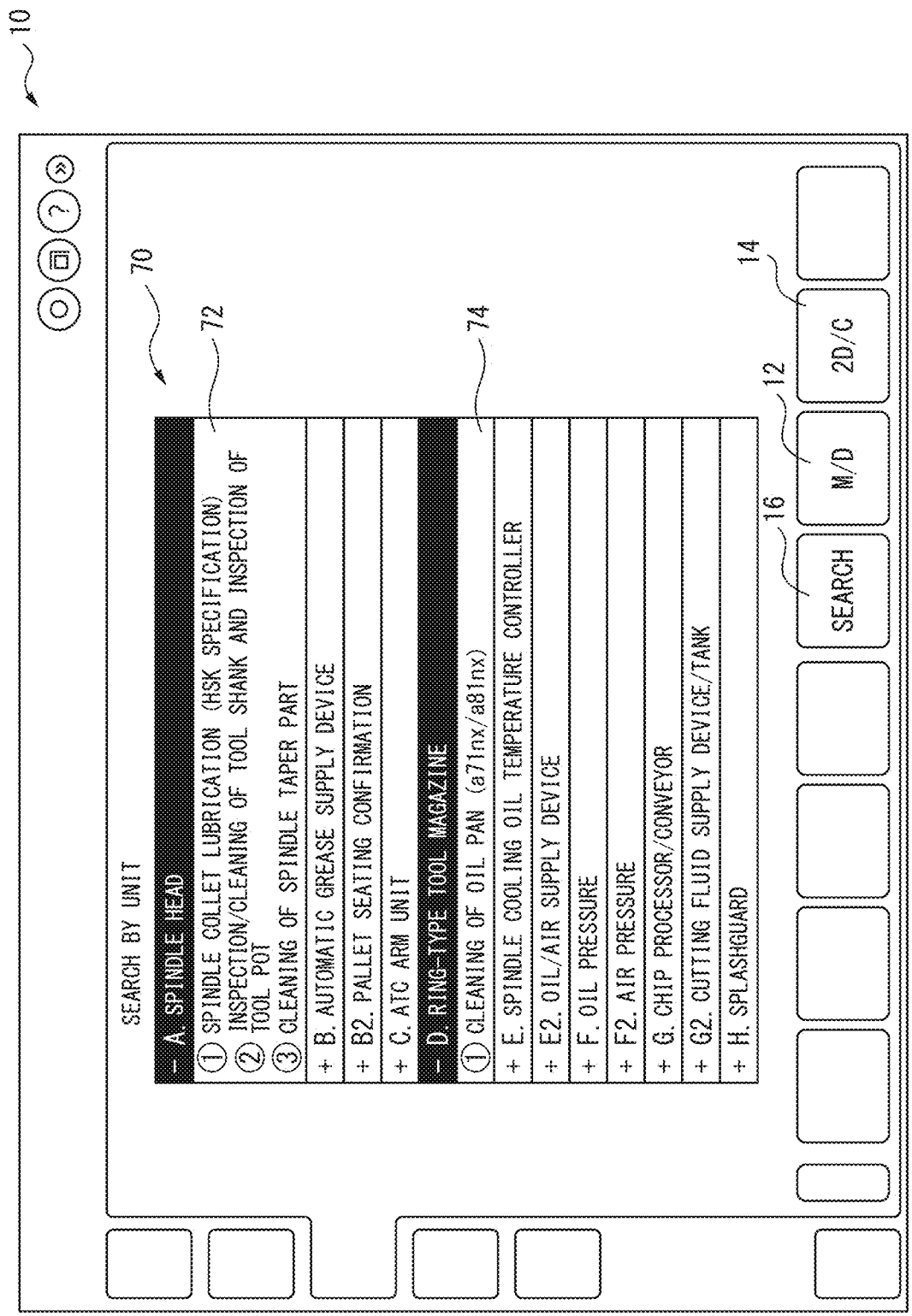

ELECTRONIC MANUAL FOR MACHINE TOOL AND MACHINE TOOL

CROSS-REFERENCE TO RELATED APPLICATIONS

This application is a U.S. national phase patent application of International Patent Application No. PCT/JP2016/076701, filed Sep. 9, 2016, which is hereby incorporated by reference in the present disclosure in its entirety.

FIELD OF THE INVENTION

The present invention relates to an electronic manual for a machine tool for displaying information related to the operation, maintenance, or inspection of the machine tool, which is necessary for an operator, and a machine tool which can display the electronic manual.

BACKGROUND OF THE INVENTION

Since machine tools have a wide variety of specifications, mechanisms, functions, and target groups which are complicated, the instruction manuals therefor become enormous. A certain degree of skill is necessary in order to find necessary information in such an enormous instruction manual, and some users cannot obtain necessary information even while in possession of the instruction manual. Furthermore, machine tools are generally used for long periods of time, during which parts are improved on the manufacturer side and new products can be used for the lubricating oils and coolants thereof, which are consumables.

Patent Literature 1 describes a machining device in which an input screen for inputting operation items is displayed on a display monitor of the machining device by means of the reading of identification codes recorded in an instruction manual with a reader connected to the controller of the machining device.

PATENT LITERATURE

[PTL 1] Japanese Unexamined Patent Publication (Kokai) No. 2014-24150

BRIEF SUMMARY OF THE INVENTION

In the machining device of Patent Literature 1, the time and effort of the inputting of maintenance information are reduced, and maintenance information can be accurately inputted in a short time. However, there are various types of maintenance, and the individual maintenance operations have different operation methods and time intervals at which the maintenance should be performed. Simply by simplifying the input operation as in Patent Literature 1, it remains unclear which operation item it is necessary to input in order to obtain appropriate maintenance information. Furthermore, in the case of not only maintenance and inspection but also malfunctions in the machining device, it is difficult to obtain information related to the operation to resolve the malfunction unless the correspondence between the malfunction and the operation item to be input to the display monitor is known.

The present invention aims to solve such problems of the prior art by providing an electronic manual for a machine tool which can display information related to the operation, maintenance, and inspection of a machine tool, depending on a status, in a simple manner, and a machine tool which can display such an electronic manual.

In order to achieve the above object, according to the present invention, there is provided an electronic manual for a machine tool for displaying information related to operation, maintenance, or inspection of the machine tool, which is necessary for an operator, the electronic manual comprising an operator-operated input part for inputting search conditions to search the electronic manual in accordance with intent of the operator in order to obtain necessary information, a machine-operated input part for selecting and inputting at least one item provided to the operator from the machine tool depending on a status of the machine tool, and a display part for displaying information related to operation, maintenance, or inspection of the machine tool corresponding to the input from the operator-operated input part or the machine-operated input part.

Further, according to the present invention, there is provided a machine tool in which a workpiece and a tool are moved relative to each other to machine the workpiece, the machine tool comprising an operator-operated input part for inputting search conditions to search an electronic manual in accordance with intent of the operator in order to obtain necessary information, a machine-operated input part for selecting and inputting at least one item provided to the operator from the machine tool depending on a status of the machine tool, and a display part for displaying information related to operation, maintenance, or inspection of the machine tool corresponding to the input from the operator-operated input part or the machine-operated input part.

According to the present invention, necessary information can be located in a simple manner even when the operator lacks skill in relation to the searching of the instruction manual. In particular, at least one item is provided from the machine tool depending on the status of the machine tool, and the operator can perform input by selecting the item, whereby information depending on the status of the machine tool can be reliably provided to the operator.

BRIEF DESCRIPTION OF THE DRAWINGS

FIG. 6 is a view showing an example of a search window constituting an operator-operated input part displayed on the display part.

FIG. 7 is a view showing an example of a search method selection window constituting the operator-operated input part displayed on the display part.

FIG. 8 is a view showing an example of a unit search window constituting the operator-operated input part displayed on the display part.

FIG. 9 is a view of the unit search window of FIG. 7 in which one item is open.

FIG. 10 is a view of the unit search window of FIG. 7 in which two items are open.

DETAILED DESCRIPTION OF THE INVENTION

Preferred embodiments of the present invention will be described below with reference to the attached drawings.

Figure 1:
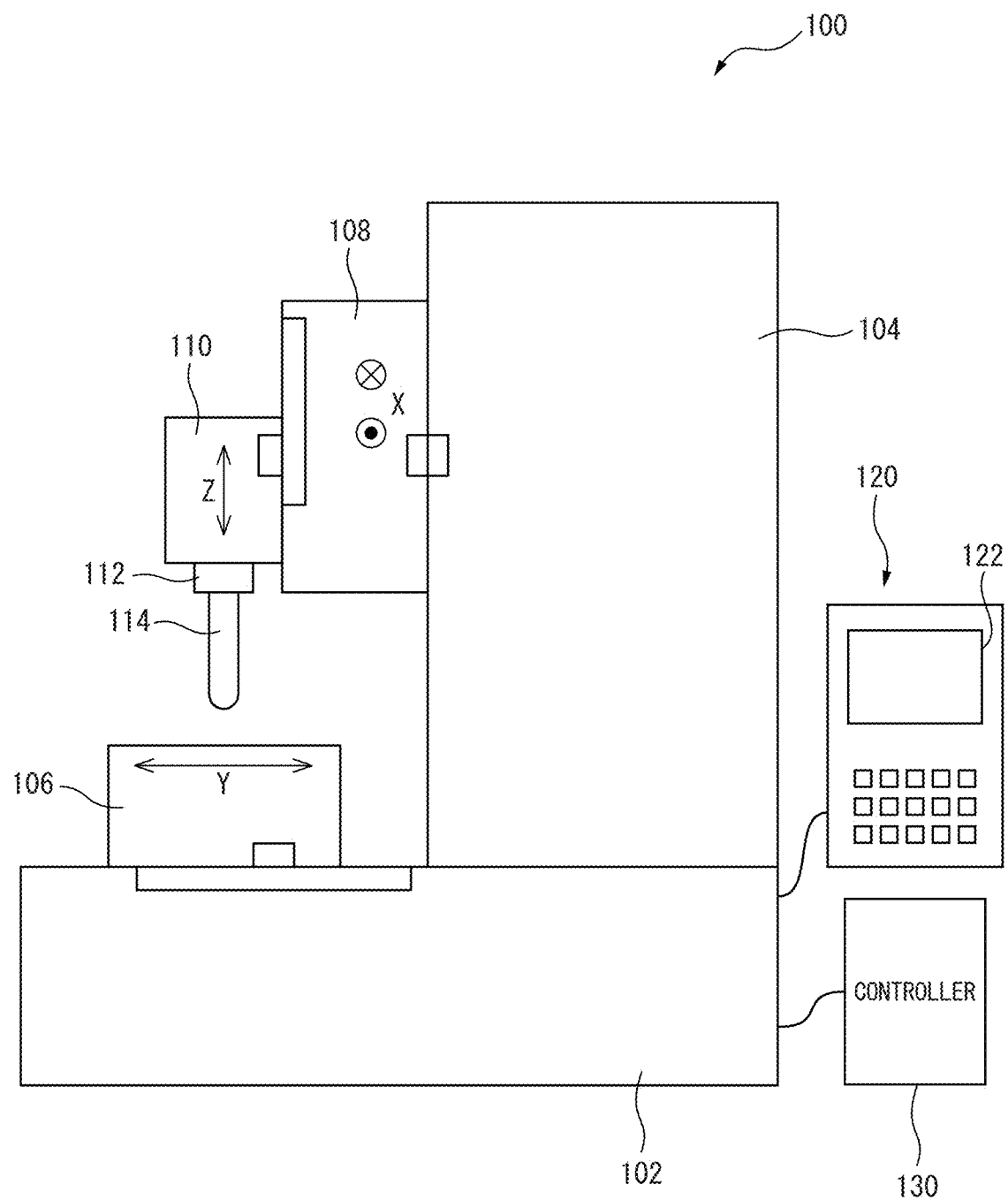
FIG. 1 is a side view of a machine tool according to an embodiment of the present invention.

FIG. 1 shows an example of a machine tool to which the present invention is applied. In FIG. 1, the machine tool 100 according to a preferred embodiment of the present invention constitutes a vertical machining center which is controlled by a controller 130. The machine tool 100 comprises a bed 102 as a base fixed to the floor surface of a factory, a table 106 which is provided on an upper surface of a front portion (left side in FIG. 1) of the bed 102 so as to be moveable in the forwards and backwards directions or the Y-axis directions (the left and right directions in FIG. 1) and on which a workpiece W is fixed, an upright column 104 which is fixed on the upper surface of the bed 102 on the rear end side of the bed 102 (the right side in FIG. 1), an X-axis slider 108 which is provided on a front surface of the column 104 so as to be movable in the left and right directions or the X-axis directions (the direction perpendicular to the sheet of the drawing of FIG. 1), and a spindle head 110 which is attached on a front surface of the X-axis slider 108 so as to be movable in the upward and downward directions or the Z-axis directions and which rotatably supports a spindle 112. A tool 114 for machining the workpiece W fixed to the table 106 is mounted on the tip of the spindle 112.

Figure 2:
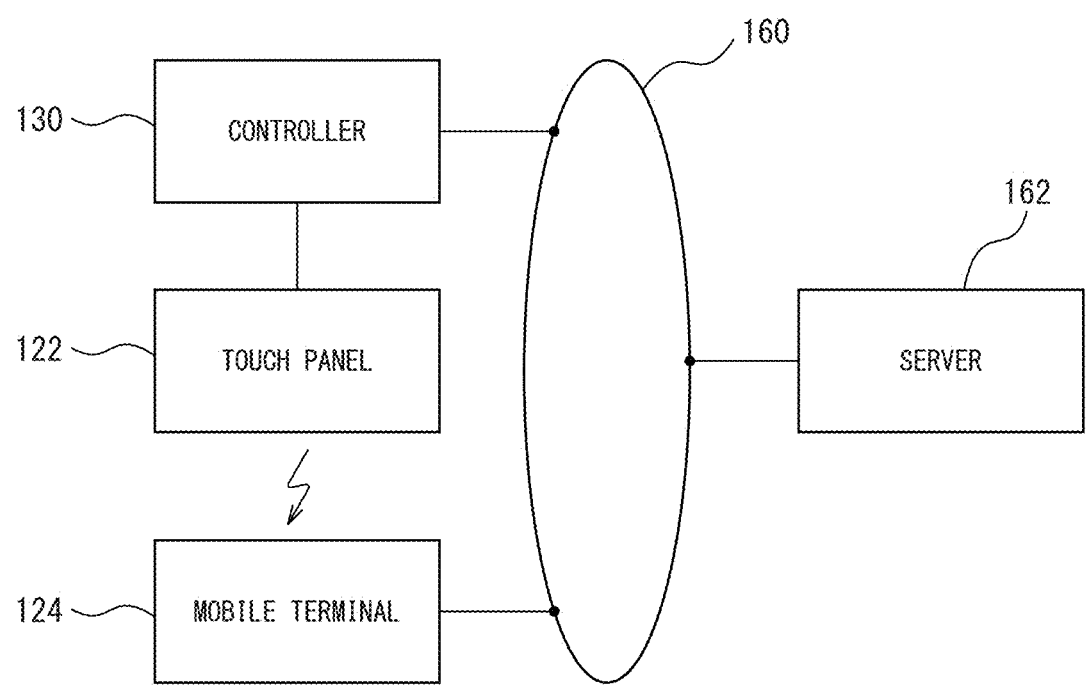
FIG. 2 is a block diagram showing an electronic manual which is connected to a server via the Internet.

The machine tool 100 further comprises an operation panel 120 with which an operator can operate the machine tool 100. The operation panel 120 comprises a touch panel 122 serving as the display part with which a desired portion can be selected by touching a screen. The operation panel 120 is connected to the controller 130 in which the electronic manual is stored. As shown in FIG. 2, the electronic manual may be stored on a server 162 and the operation panel 120 may be connected to the server via the Internet 160. When connection is established via the Internet 160, individual machine tools have security information for accessing the server such as accounts, passwords or user authentication information.

In FIGS. 3 to 10, when the operator operates the electronic manual, a main window 10 for displaying information related to the machine tool is displayed on the touch panel 122 of the operation panel 120. The main window 10 includes an area 18 for displaying an alarm window 20, a periodic inspection window 30, and a search window 50, which are described later, a selection button 12, a two-dimensional code generation button 14, and a search button 16.

The controller 130 of the machine tool 100 continuously monitors each part of the machine tool 100 when the machine tool 100 is powered on and generates an alarm when a malfunction occurs in any of the parts of the machine tool 100. In particular, in the present embodiment, as shown in FIG. 2, the alarm window 20 is displayed in the main window 10 on the touch panel 122, whereby the operator can be notified that a malfunction has occurred in the machine tool 100.

Figure 3:
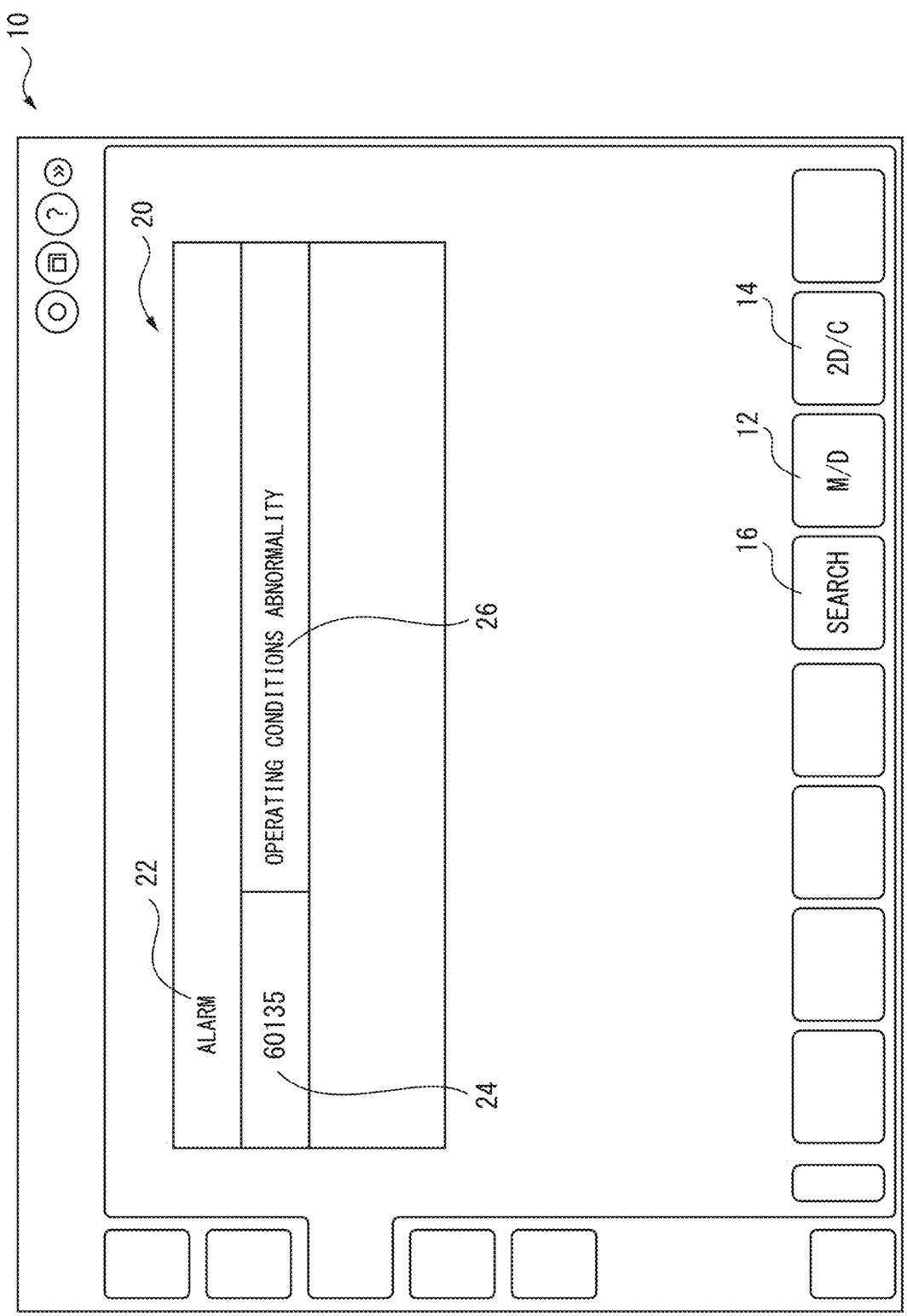
FIG. 3 is a view showing an example of an alarm window constituting a machine-operated input part displayed on a display part.

Referring to FIG. 3, the alarm window 20 includes an area 22 for displaying that the window is an alarm window, an area 24 for displaying an alarm code, and an area 26 for displaying a malfunction item. Table 1 shows examples of malfunction items along with alarm codes. Though a single malfunction item is displayed in FIG. 3, a plurality of malfunction items can be displayed.

TABLE 1

| Alarm Code | Item |
| --- | --- |
| 60131 | ATC Shutter Open Start Condition Abnormality (Operator Side Door Open) |
| 60132 | ATC Shutter Close Start Condition Abnormality (Operator Side Door Open) |
| 60133 | ATC Operation Start Condition Abnormality (Operator Side Door Open) |
| 60134 | Spindle Tool Clamp/Unclamp Operation Start Condition Abnormality (Operator Side Door Open) |
| 60135 | ATC Operation Start Condition Abnormality (Tool Magazine Manual Intervention) |
| 60136 | ATC Operation Condition Abnormality (TLS Door Open) |
| 60137 | ATC Operation Condition Abnormality (Spindle Tool Diameter/Length 0) |
| 60138 | ATC Operation Condition Abnormality (Spindle Tool Diameter 0) |
| 70047 | Spindle Command Abnormality |
| 70048 | Clamp Mechanism State Abnormality |
| 70049 | Spindle Start-Up Condition Abnormality |
| 70050 | Set Speed Abnormality |
| 70051 | Spindle Start-Up Condition Abnormality |
| 70052 | Spindle Start-Up Condition Abnormality |
| 70053 | Drawbar Probe Advancement Start Condition Abnormality |
| 70054 | Condition Abnormality During Drawbar Probe Advancement Operation |
| 920033 | Condition Abnormality During Pallet Change Operation (Time Limit Exceeded) |
| 920034 | Reconfirming Pallet Seating Confirmation |
| 920035 | Pallet Seating Confirmation Limit Switch Abnormality |
| 920036 | Pallet Seating Abnormality |
| 920037 | Pallet Seating Abnormality |
| 920040 | Condition Abnormality During Pallet Change Operation |

Figure 4:
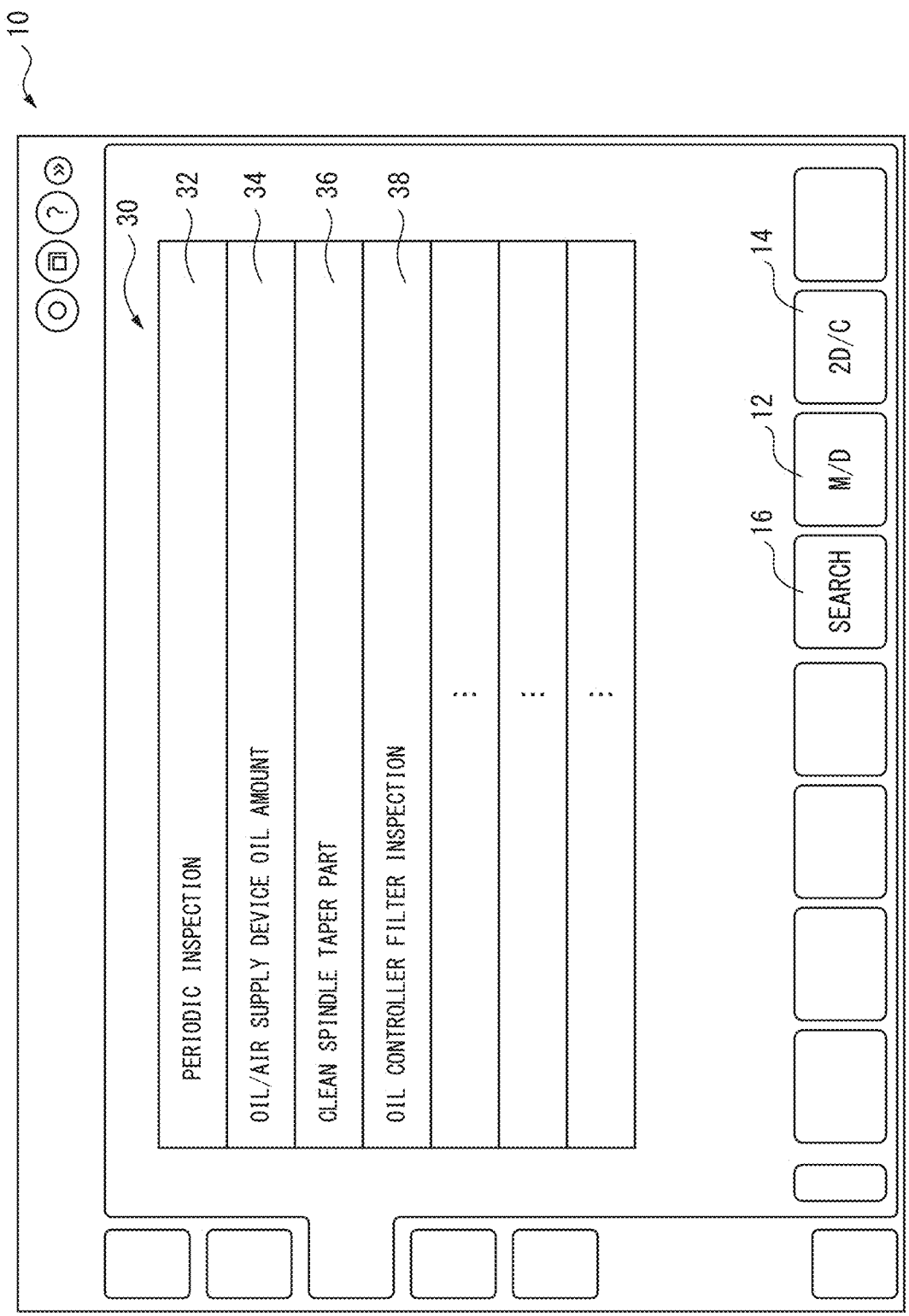
FIG. 4 is a view showing an example of a periodic inspection window constituting the machine-operated input part displayed on the display part.

Furthermore, FIG. 4 shows a periodic inspection window displayed on the touch panel 122 of the operation panel 120 as a message issued from the controller 130 of the machine tool 100 to the operator in order to prompt the operator to perform a periodic inspection. The periodic inspection is an item performed regardless of the uptime of the machine, such as a six-month inspection, a one-year inspection, or a two-year inspection, or an item performed in accordance with the uptime of the machine, such as a 160-hour inspection, a 500-hour inspection, or a 1000-hour inspection. Table 2 shows examples of periodic inspections.

TABLE 2

Please inspect oil amount in oil/air supply device and replenish if low
Please clean spindle taper part
Please inspect oil filter of oil controller and clean if very dirty
Please inspect oil flow of oil controller with the flow gauge
Please inspect spindle-through line filter/suction filter
Please inspect drum filter backwash amount
Please inspect waste oil tank
Please inspect amount of cutting oil and replenish if low
Please inspect scale air pressure (for machines with scale)
Please inspect main air pressure
Please inspect amount of hydraulic oil of hydraulic device
Please inspect pressure of hydraulic oil of hydraulic device
Please adjust tension of outboard conveyor chain
Please replace filter net of drum filter
Please clean/replace line filter/suction filter
Please inspect filter net of drum filter
Please inspect coolant V seal
Please clean coolant tank
Please replace scale air oil mist filter (for machines with scale)
Please replace main air filter
Please clean air dryer condenser fins
Please clean suction filter of hydraulic device
Please clean fan cooler of hydraulic device TABLE 2-continued Please replace hydraulic oil of hydraulic device
Please replenish grease of Y-axis pantograph Regarding each inspection item, the controller 130 of the machine tool 100, simply counts the time which has elapsed since the prior inspection or since the performance of a maintenance operation associated with an inspection for items executed irrespective of uptime, and counts the elapsed time in accordance with the uptime of the machine regarding items executed in accordance with the uptime of the machine. When the counted elapsed time reaches a value specified for an inspection item, the controller 130 displays the periodic inspection window 30 on the touch panel 122 of the operation panel 120. The periodic inspection window 30 includes an area 32 for displaying that the window is a periodic inspection window, and an area for displaying inspection items 34 to 38.

When the alarm window 20 or the periodic inspection window 30 is open, if the operator taps and selects one or a plurality of items from the malfunction item 34 of the inspection items 34 to 38 and taps the selection button 12, information related to the selected item(s) is displayed on the touch panel 122. When a plurality of items are selected, each of the plurality of items can be displayed in an individual tab. The information displayed on the touch panel 122 includes the name of the part in which the malfunction has occurred, the method for accessing the part in which the malfunction has occurred, an alarm resolution procedure, the name, serial number, and replacement method of a part to be replaced, the method for accessing the part for which periodic inspection should be performed, inspection methods such as visual inspection and verification of gauges, a maintenance procedure, and the name, serial number, and replacement method of a part to be replaced.

Figure 5:
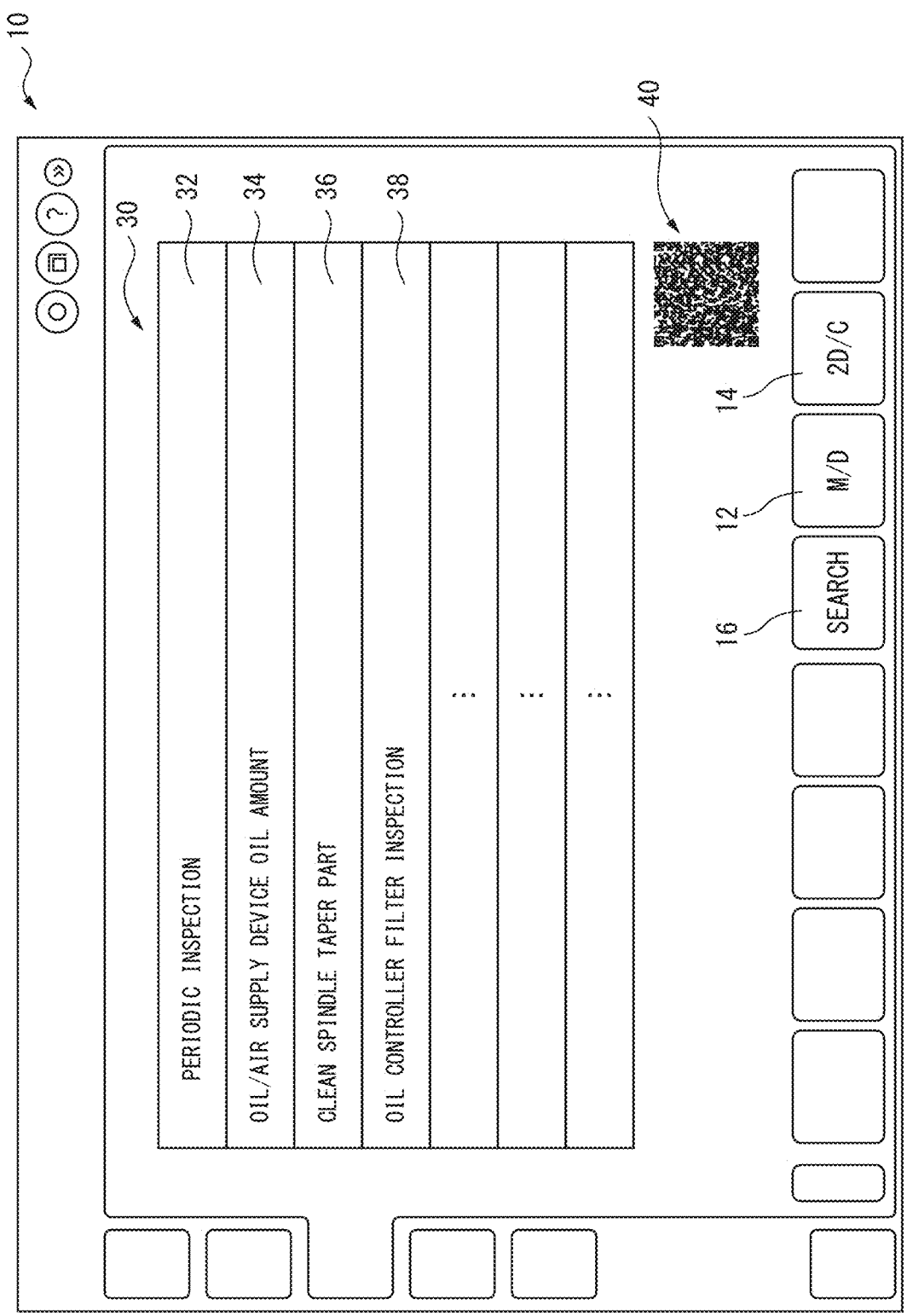
FIG. 5 is a view of the periodic inspection window of FIG. 3, which shows a two-dimensional code.

Furthermore, when the two-dimensional code generation button 14 is tapped after item selection, a two-dimensional code 40 is displayed on the touch panel 122, as shown in FIG. 5. As shown in FIG. 2, when the two-dimensional code 40 is read by a mobile terminal 124, information can be displayed on the mobile terminal 124 via the Internet 160. The two-dimensional code 40 can include a URL and security information necessary for the mobile terminal to access the server on which the electronic manual is stored, as well as the above malfunction items and periodic inspection items. Furthermore, the mobile terminal 124 can be a commercially available smartphone or tablet, rather than a special device provided by the manufacturer of the machine tool 100.

Thus, when a malfunction occurs in a part of the machine tool 100, or when the amount of time which has elapsed since the prior periodic inspection becomes a value specified for an inspection item, by displaying the alarm window 20 or the periodic inspection window 30 on the touch panel 122 of the operation panel 120, the operator can be prompted by the machine tool 100 to perform an operation to resolve the malfunction or to perform the periodic inspection. In the present invention, the alarm window 20 and the periodic inspection window 30 constitute machine-operated input parts.

When the alarm window 20 or the periodic inspection window 30 is displayed on the touch panel 122, by tapping the alarm window 20 or the periodic inspection window 30, information related to a resolution operation, such as an operation to resolve a malfunction, a method for accessing a part of the machine tool 100 for which an inspection operation should be performed, or a method for replacement of a part, or an inspection operation can be provided to the operator in a simple manner. Furthermore, by displaying the two-dimensional code 40 on the touch panel 122 and reading the two-dimensional code 40 with a smartphone or tablet, information related to the resolution operation or inspection operation is displayed on the smartphone or tablet, whereby information can be provided to the operator in a location separated from the touch panel 122.

In the embodiment described above, the controller 130 of the machine tool 100 automatically displays the alarm window 20 and the periodic inspection window 30 on the touch panel 122. However, naturally, the operator can refer to the instruction manual as necessary. FIG. 6 shows a search window (top screen) with which the operator can search the electronic manual in such a case.

The search window 50 is opened by tapping the search button 16 of the main window 10. The search window 50 includes a plurality of items corresponding to major items in the table of contents of a paper instruction manual. When the operator taps and selects one item from the plurality of items, a search method selection window 54 with which the operator can select a search method from a plurality of search methods for searching the information related to the selected item opens.

For example, when preventative maintenance item 52 is tapped and selected, the search method selection window 54 related to preventative maintenance of the machine tool 100 opens, as shown in FIG. 7. The search method selection window 54 includes a time search button 56 for searching by time, an appearance search button 58 for searching based on the appearance of the machine tool 100, a unit search button 60 for searching based on the units constituting the machine tool 100, an index button 62 for searching by keyword, and a movie search button 64 for searching video files explaining inspection methods and methods for replacing parts by means of a video. A similar search method selection window is opened when another item is selected.

When the operator taps and selects, for example, the unit search button 60 in the search method selection window 54, the unit search window 70 of FIG. 8 opens. The unit search window 70 is constituted by a list of the plurality of units constituting the machine tool 100, such as, for example, a spindle head, an automatic grease supply device, a pallet seating confirmation device, an ATC (automatic tool change) arm unit, a ring-type tool magazine, a spindle cooling oil temperature controller, an oil/air supply device, a hydraulic device, a pneumatic device, a chip processor/conveyor, a cutting fluid supply device/tank, and a splashguard.

When the operator taps and selects, for example, the item related to the spindle device from the units displayed in the unit search window 70, as shown in FIG. 9, the item related to the spindle device opens, and a list window 72 of inspection items related to the spindle 112 of the machine tool 100 is displayed. In FIG. 9, the inspection item list of the spindle device includes lubrication of a spindle collet, inspection and cleaning of a tool shank and inspection of a tool pot, and cleaning of a spindle taper part.

As described regarding the alarm window 20 and the periodic inspection window 30, when the operator taps and selects one item or a plurality of items from the list window 72 of inspection items, and taps the selection button 12, information related to the selected item is displayed on the touch panel 122. When a plurality of items are selected, each of the plurality of items can be displayed in an individual tab. The information displayed on the touch panel 122 includes the name of the part in which the malfunction has occurred, the method for accessing the part in which the malfunction has occurred, the name, serial number, and replacement method of a part to be replaced, a method for accessing the part for which inspection should be performed, inspection methods such as visual inspection or confirmation of gauges, and the name, serial number, and replacement method of a part to be replaced.

Furthermore, when the two-dimensional code generation button 14 is tapped after item selection, a two-dimensional code 40 which is similar to the two-dimensional code 40 described above is displayed on the touch panel 122. By reading this two-dimensional code with a smartphone or tablet, information can be displayed on the smartphone or tablet via the Internet 160.

The list window of inspection items is not limited to a list window related to a single unit, as shown in FIG. 9. The list windows 72, 74 related to a plurality of units, as shown in FIG. 10, or alternatively, inspection item list windows related to all of the units displayed in the unit search window 70 may be opened.

Further, in the embodiment described above, the operator can display the search window 50 on the touch panel 122, which enables the user to search and refer to the electronic manual as necessary. The search window 50 provides a plurality of search methods to the operator, and thus, in the present invention, the search window 50 constitutes an operator-operated input part.

REFERENCE SIGNS LIST

10 Main Window
12 Selection Button
14 Two-Dimensional Code Generation Button
16 Search Button
20 Alarm Window
30 Periodic Inspection Window
40 Two-Dimensional Code
50 Search Window (Top Screen)
52 Preventative Maintenance Item
54 Search Method Selection Window
56 Time Search Button
58 Appearance Search Button
60 Unit Search Button
62 Index Button
64 Movie Search Button
70 Unit Search Window
100 Machine Tool
122 Operation Panel
124 Touch Panel
150 Controller

The invention claimed is:

1. An electronic manual for a machine tool for displaying information related to operation, maintenance, or inspection of the machine tool, which is necessary for an operator, the electronic manual comprising:
  a display; and
  a controller for the display,
  wherein the controller is configured to count elapsed time since prior inspection for one or more inspection items, and
  wherein the controller is configured to control the display so as to display:
    a first window, including a list of units constituting the machine tool, and allowing an operator to select one of the units,
    a second window, when one of the units is selected, the second window including a plurality of items related to operation, maintenance or inspection of the selected unit, and allowing the operator to select and input one of the items to search the electronic manual in accordance with intent of the operator in order to obtain necessary information,
    a third window, without being prompted by the operator, when the counted elapsed time reaches a predetermined time set for each of the inspection items, the third window allowing the operator to select and input at least one of the inspection items, in order to obtain necessary information related thereto, and
    information related to operation, maintenance, or inspection of the machine tool corresponding to the input from the second window or the third window.

2. The electronic manual for a machine tool according to claim 1, wherein the electronic manual is stored in a controller of the machine tool, an Internet-connected server, or a mobile terminal.

3. The electronic manual for a machine tool according to claim 2, wherein a two-dimensional code related to information related to operation, maintenance, or inspection of the machine tool displayed on the display part is further displayed on the display part, and
  the mobile terminal is connected to a server via the Internet as a result of reading of the two-dimensional code by the mobile terminal, and the information related to operation, maintenance, or inspection of the machine tool displayed on the display part is displayed on the mobile terminal.

4. A machine tool in which a workpiece and a tool are moved relative to each other to machine the workpiece, the machine tool comprising:
  a table on which the workpiece is placed;
  a tool for machining the workpiece;
  a display; and
  a controller for the machine tool,
  wherein the controller is configured to count elapsed time since prior inspection for each inspection items, and
  wherein the controller is configured to control the display so as to display:
    a first window, including a list of units constituting the machine tool, and allowing an operator to select one of the units,
    a second window, when one of the units is selected, the second window including a plurality of items related to operation, maintenance or inspection of the selected unit, and allowing the operator to select and input one of the items to search the electronic manual in accordance with intent of the operator in order to obtain necessary information,
    a third window, without being prompted by the operator, when the counted elapsed time reaches a predetermined time set for each of the inspection items, the third window allowing the operator to select and input at least one of the inspection items, in order to obtain necessary information related thereto, and
    information related to operation, maintenance, or inspection of the machine tool corresponding to the input from the second window or the third window.

* * * * *